Nov. 3, 1925.
W. J. GROTENHUIS
1,559,607
AUTOMOBILE BUMPER
Filed June 22, 1922
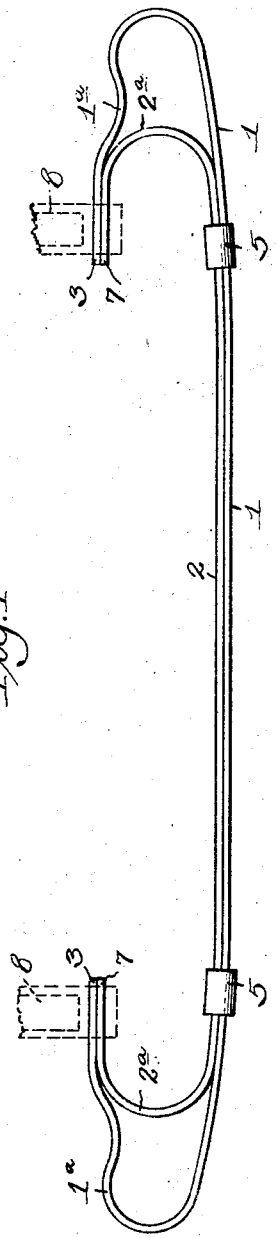
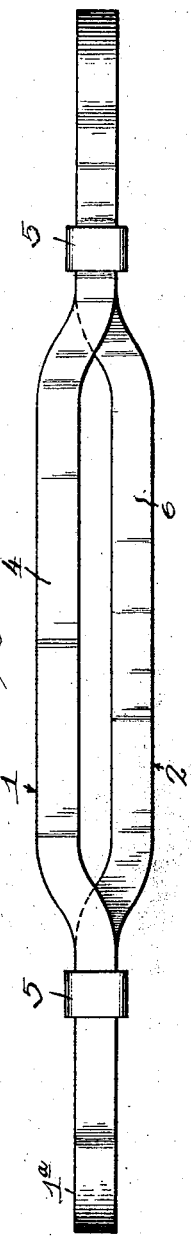
Inventor,
William J. Grotenhuis.

Patented Nov. 3, 1925.

1,559,607

UNITED STATES PATENT OFFICE.

WILLIAM J. GROTENHUIS, OF CHICAGO, ILLINOIS, ASSIGNOR TO BIFLEX PRODUCTS COMPANY, OF WAUKEGAN, ILLINOIS, A CORPORATION OF DELAWARE.

AUTOMOBILE BUMPER.

Application filed June 22, 1922. Serial No. 570,115.

*To all whom it may concern:*

Be it known that I, WILLIAM J. GROTENHUIS, a citizen of the United States, and a resident of Chicago, in the county of Cook and State of Illinois, have invented certain new and useful Improvements in Automobile Bumpers, of which the following is a specification.

This invention relates to improvements in automobile bumpers and more particularly to bumpers constructed of resilient bars shaped to form a forwardly disposed impact member, and looped end portions, adapted for attachment to the ends of the automobile frame members, by means of suitable brackets.

The object of the invention is to provide a new and novel construction for a bumper of the general description herein above set forth, which is specially designed to be attached to the rear end of an automobile.

A further object is to provide a suitable construction for rear bumpers which may be attached without interfering with spare tires and their racks, which are ordinarily carried at the rear of automobile.

A preferred construction for a bumper embodying the invention is illustrated in the accompanying drawings in which:

Fig. 1 is a top plan view of the bumper and

Fig. 2 is a view in front elevation of the same bumper.

In general the bumper is made up of two flexible bars of spring steel, these bars being treated so that their wider faces extend vertically, thus providing the required resiliency in a horizontal direction and comparatively little, if any resiliency in a vertical direction. Throughout the central portion of the bumper the bars are spaced apart vertically so as to provide an impact area of increased width for the purpose of affording greater protection than would be afforded by a single bar.

As clearly shown in Figure 1, the two bars hereintofore referred to, may be identified as an outer bar 1, and an inner bar 2, inasmuch as the latter bears flatwise against the outer bar and has its ends bent or looped within, and included by, the looped ends of the outer bar. The outer bar is bent or shaped to provide an impact portion extending the full length of the bumper, and having its end portions 1ª 1ª bent rearwardly and inwardly to form round looped ends which terminate at a short distance inwardly from the ends of the bumper in straight end portions 3, 3 extending parallel to the forward portion. Throughout the central portion of the impact section of the bar 1, the same is offset to provide the upper one-half 4 of the central impact area of the bumper.

The inner bar 2 bears flatwise against the outer bar 1 throughout the portion intermediate the offset portion 4 and the end portions 1ª 1ª, said bars being securely clamped together by means of clamps 5, 5 located on both sides of the central impact area. The central portion of the inner bar 2 is downwardly offset forming the lower half 6, of said central impact area and corresponding to the offset portion 4 of the outer bar 1. Just outwardly beyond the clamps 5 5, the inner bar is bent so as to provide substantially semi-circular looped end portions 2ª 2ª, which terminate in relatively short straight rear end portions 7, 7 lying flatwise along the end portions 3, 3 of the outer bar and terminating flush with the ends thereof. As clearly shown in Figure 1 of looped end portions 2ª 2ª of the inner bar 2 are positioned inwardly from the looped extremities of the outer bar and lie substantially midway between the points of clamping connections of the bars, and the extreme ends of the bumper.

Suitable brackets 8 8, consisting in part of clamps which engage the end portions 3 and 7 of the bars, serve to attach the bumper to the frame members of the automobile.

It is to be observed that in attaching the bumper of the automobile open space is afforded between the brackets 8 8, and extending outwardly to the impact portion of the bumper, thereby affording ample room for spare tires or other accessories that may be mounted at the rear of the automobile. To compensate for the absence of a rearwardly disposed rear end forcing bar extending the full length of the bumper behind the central portion thereof, the ends of the inner bar 2, are carried rearwardly and then bent inwardly, terminating flush with the ends of the outer bar in the manner already described, and as these looped ends of the inner bar provide transverse resiliency they serve to materially increase the strength of the bumper and to impart that degree of stiffness to resist the shock of the impact in the event of a collision. Furthermore the inner loops reinforce the looped ends of the outer bar, thus preventing permanent distortion under blows received at the ends of the bumper. The widened impact area at the center of the bumper affords increased protection in that it distributes the shock more uniform throughout the bumper structure and moreover prevents other bumpers or projections from passing over or beneath the bumper itself, this being specially true where collision takes place with another automobile having single bar bumper at its forwarding end.

Having described the novel features of the issues thereof, I claim as my invention:

1. An automobile bumper comprising a pair of resilient bars secured in flatwise contact adjacent the ends of the forward portion thereof, the outer bar being extended laterally and thence rearwardly and inwardly to form the looped ends of the bumper, and the inner bar being bent rearwardly and inwardly short of the extremities of the looped ends of the bumper, the free ends of said bars being brought together in flatwise contact to form rearwardly disposed attaching members extending transversely of the points of attachment.

2. An automobile bumper comprising a pair of resilient bars clamped together in flatwise contact throughout the portions adjacent the ends of the impact member thereof, the outermost bar being extended to form relatively long looped ends of the bumper with its free ends terminating adjacent the points of attachment, the inner bar being bent rearwardly in substantially semi-circular shape and extending intermediate the outer extremities of the bumper and the points of attachment thereof with the vehicle, the ends of said inner bar having flatwise contact with the ends of the outer bar and adapted to be clamped therewith at the points of attachment with the vehicle.

In testimony whereof, I hereunto subscribe my name this 19th day of June, A. D. 1922.

WILLIAM J. GROTENHUIS.